United States Patent [19]

Soden et al.

[11] 4,174,485
[45] Nov. 13, 1979

[54] ELECTRIC MOTOR WITH NOVEL STATOR CONSTRUCTION

[75] Inventors: George B. Soden, Wolcott; Hasit H. Parikh, Southington; Richard J. Kavanaugh, Bristol, all of Conn.

[73] Assignee: North American Philips Corporation, New York, N.Y.

[21] Appl. No.: 836,495

[22] Filed: Sep. 26, 1977

[51] Int. Cl.² ............................................ H02K 5/00
[52] U.S. Cl. .................................. 310/89; 310/49 R; 310/216; 310/259; 220/4 B
[58] Field of Search ................. 310/259, 49, 162, 163, 310/164, 216, 89, 40 MM, 42, 258; 336/83, 90; 220/4 B, 4 E; 338/119

[56] References Cited

U.S. PATENT DOCUMENTS

| | | | |
|---|---|---|---|
| 2,417,195 | 3/1947 | Hargreaves | 310/89 UX |
| 3,549,918 | 12/1970 | Croymans | 310/162 |
| 3,633,055 | 1/1972 | Maier | 310/162 |
| 3,693,034 | 9/1972 | Inariba | 310/49 R |
| 4,034,247 | 7/1977 | Wagensonner | 310/49 R |

FOREIGN PATENT DOCUMENTS 267668 1/1969 Austria ........................................ 310/89

Primary Examiner—R. Skudy
Attorney, Agent, or Firm—Robert S. Smith

[57] ABSTRACT

An electric motor has a stator construction which includes identical facing cup shaped members having a circumferential surface which includes a plurality of tabs and recesses. The tabs of one cup shaped member are dimensioned and configured for an engagement with the recesses of the other cup shaped member to positively position axially and radially each cup shaped member relative to the other. In one form the tabs may have a negative taper such that the base extremity of the tab has a smaller width than the other extremity of the tab. The negative taper produces a more pronounced interference fit and causes the cups to snap together without the necessity for cementing, welding, or other metal joining process. Each cup in one form is also provided at a plurality of angularly spaced recesses for receiving two identical generally planar plates having cooperating tabs and upstanding pole pieces. The recesses in one form extend along the circumferential surfaces to the tabs.

7 Claims, 5 Drawing Figures

ELECTRIC MOTOR WITH NOVEL STATOR CONSTRUCTION

BACKGROUND OF THE INVENTION

Electric motors such as stepping motors having a plurality of pole pieces. It will be understood that while the invention has particular application to electric motors, it also has application to other apparatus having similar pole piece construction such as dnamos, tachometers, generators, etc. Accordingly the term electric motor should be deemed herein to include such other apparatus. The prior art constructions have frequently used nesting cup shaped members. While this construction has been found suitable for many applications, there are inherent problems in such a construction. These problems include holding the two or more cup shaped members, which form the stator, in a precise predetermined angular and axial relationship and then connecting them by tackwelding or other joining techniques. Obviously there are tolerances on the cooperating surfaces of the two cup shaped members which form the stator. In those motor constructions which have two axially spaced multipole stator sections, the problem of tolerance build-up between the two sections is a problem particularly because of the importance of precise orientation. The assembly operation for the prior art constructions involve significant assembly time and difficulty because the various cup shaped members cannot be easily grasped and the precise geometric relationship quickly and easily established. Still another problem is that the physical bulk of the stator assembly is increased by the overlapping cup shaped members not only in the radial but the axial dimension of the stator. In some applications it is highly desirable to minimize these dimensions and the nesting cup shaped members limit accomplishment of this goal.

It is an object of the present invention to provide a novel electric motor having a stator construction which has extremely precisely positioned stator pole pieces.

It is also an object to provide such a motor which minimizes the problem of tolerance build-up between mating parts particularly with respect to the angular orientation of the pole pieces.

It is still another object of the invention to provide a stator construction which has a minimum of physical bulk.

Yet another object of the invention is to provide a motor having a stator construction which has parts which may be manufactured with a minimum of expense and more particularly which utilizes a maximum number of parts having identical geometry.

A further object is to provide a stator construction which may be assembled with a minimum amount of time and skill preferably without the necessity for special welding or other such apparatus.

SUMMARY OF THE INVENTION

It has now been found that the foregoing and related objects can be readily obtained in an electric motor having a rotor and a stator and a first cup shaped member having a wall which is disposed generally normal to the axis of the motor and a circumferential surface disposed gnerally concentric with the axis. The circumferential surface includes a plurality of tabs and a plurality of cooperatively dimensioned and configured recesses. The first cup shaped member further includes a plurality of pole pieces disposed in generally aligned relationship to the axis and disposed at angularly spaced intervals about the axis. A second cup shaped member also has a wall which is disposed generally normal to the axis of said motor and a circumferential surface disposed generally concentric with the axis. The circumferential surface includes a plurality of tabs and cooperatively dimensioned and configured recesses. The second cup shaped member further includes a plurality of pole pieces disposed in generally aligned relationship to the axis and disposed at angularly spaced intervals about the axis. The tabs of the second cup shaped member and the recesses of the first cup shaped member lock together to form a unitary assembly.

The stator further includes a plurality of additional angularly spaced recesses in both the first and second cup shaped members disposed at angularly spaced intervals about the circumferential surface along the edge which contacts the other cup shaped member. In one form the recesses extends about the circumferential surface, the complete distance intermediate two successive tabs.

First and second inner pole plates which are generally planar and have a plurality of upstanding pole pieces which are disposed when assembled in generally parallel relationship to the axis of the motor, the pole plates further including a plurality of angularly spaced tabs disposed within the plane of the generally planar members. The tabs are positioned and dimensioned for snug fit in said additional recesses of said first and second cup shaped members to prevent relative angular movement therebetween.

In another form of the invention an electric motor has a rotor, and a stator having a first cup shaped member having a wall which is disposed generally normal to the axis of the motor and a circumferential surface disposed generally concentric with the axis, the circumferential surface includes plurality of tabs and a plurality of cooperatively dimensioned and configured recesses. The first cup shaped member further includes a plurality of pole pieces disposed in generally aligned relationship to the axis and disposed at angularly spaced intervals about the axis.

A second cup shaped member has a wall which is disposed generally normal to the axis of the motor and a circumferential surface disposed generally concentric with the axis, the circumferential surface including a plurality of tabs and a plurality of cooperatively dimensioned and configured recesses, the second cup shaped member further including a plurality of pole pieces disposed in generally aligned relationship to the axis of the motor and disposed at angularly spaced intervals about said axis, the tabs of the second cup shaped member and the cutouts of the first cup shaped member locking together to form a unitary assembly. Each of the tabs on the first and second cup shaped members have a negative taper to provide an interference fit.

DETAILED DESCRIPTION OF THE PREFERRED EMBODIMENT

Figure 3:
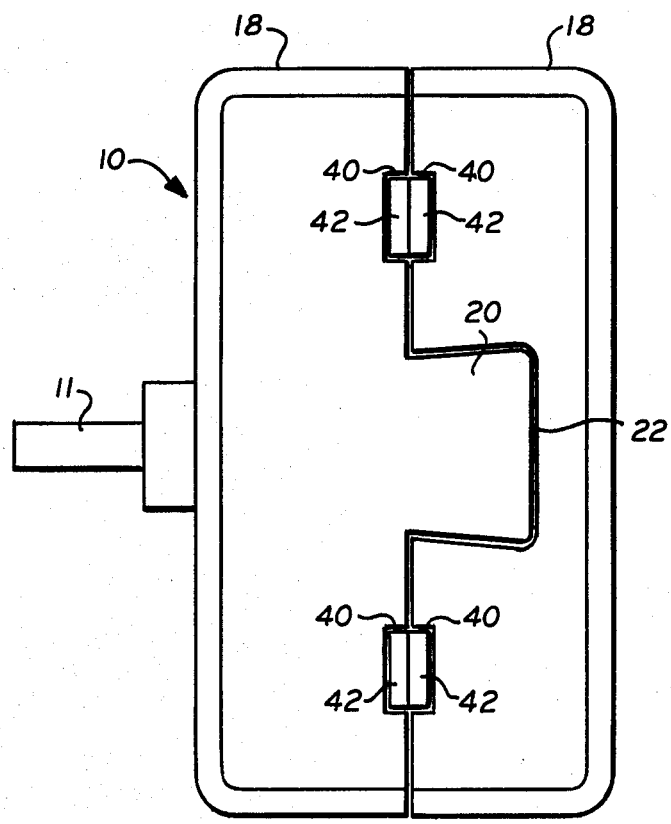
FIG. 3 is an elevational view of the motor in accordance with a second form of the invention.

Turning now in detail to FIG. 3 of the attached drawing, therein illustrated is a stepping motor 10 which includes an output shaft 11, a stator which includes two opposed axially spaced cup shaped members or stator sections 18, 18 which cooperate with a rotor (not shown) having two axially spaced sets of discrete magnetic poles (not shown) which cooperate with a plurality of pole pieces 16 on the stator disposed about them. The stator also includes two pole plates 42, 42 as will be described hereafter with respect to FIG. 4.

The two cup shaped members 18, 18 are identical and have a plurality of projecting tabs 20 which cooperate with substantially correspondingly shaped recesses or cutouts 22. In one form the tabs 20 may have a negative taper i.e. the tab will have a greater width at the end thereof most remote from the rest of the cup member and specifically a greater width than at the base nearest the rest of the cup members. It has been found that a taper angle of about one degree cooperating with a cutout having the same taper works very effectively to provide a construction which will snap together without the need for separate welding or other holding means. In this embodiment there are two tabs 20 on each cup shaped member 18 which cooperate with recesses 22 on the other cup shaped member of the stator assembly. The number chosen is not critical although it will be understood that it is desirable to have identical cup shaped members to minimize the tooling costs. Each cup shaped member 18 has integral pole pieces 16 which in the illustrated embodiment extend in the direction of the circumferential walls of the cup shaped member 18.

Figure 4:
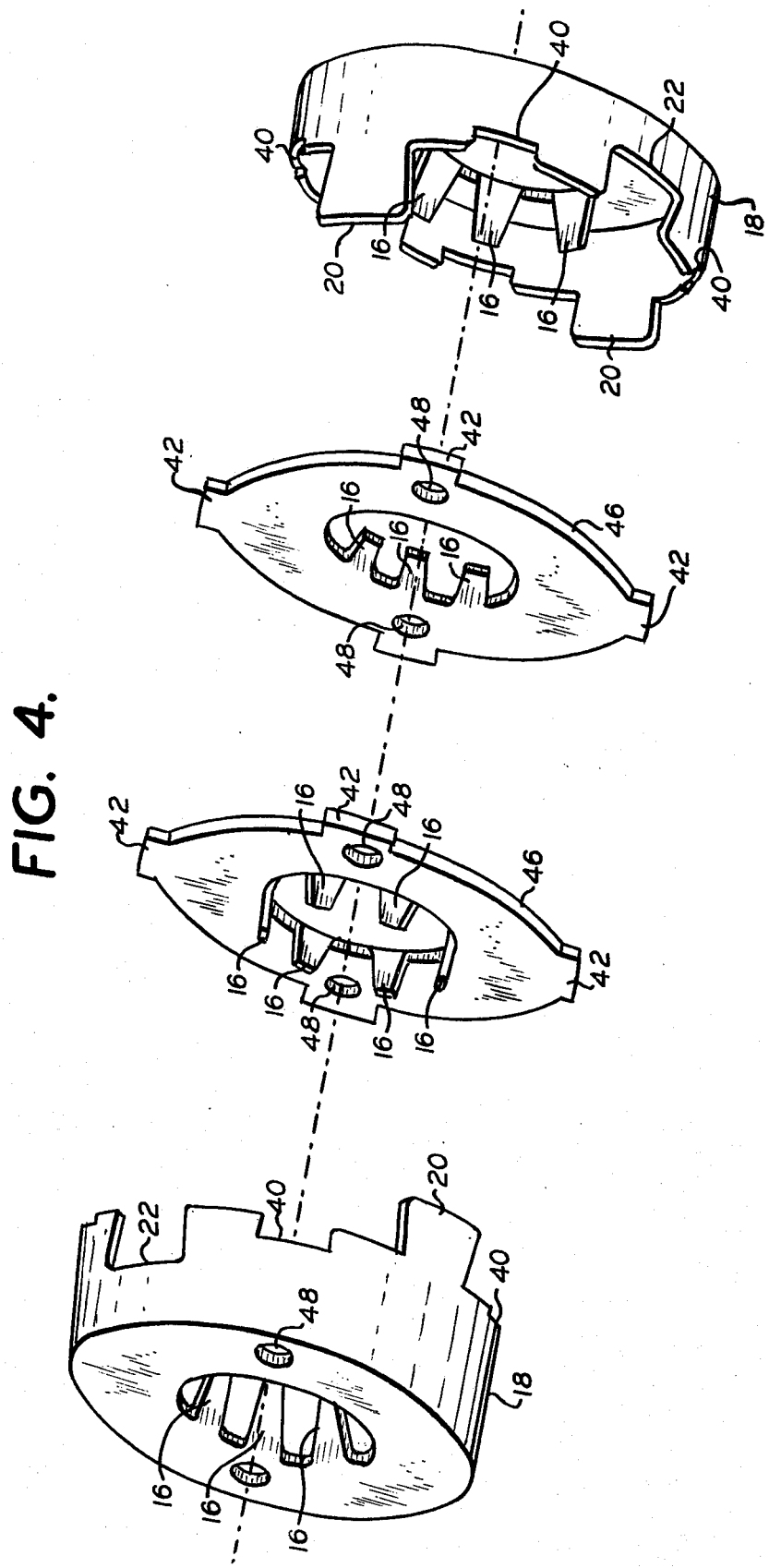
FIG. 4 is a perspective view of a stator assembly in exploded relationship of the motor shown in FIG. 3.
Figure 5:
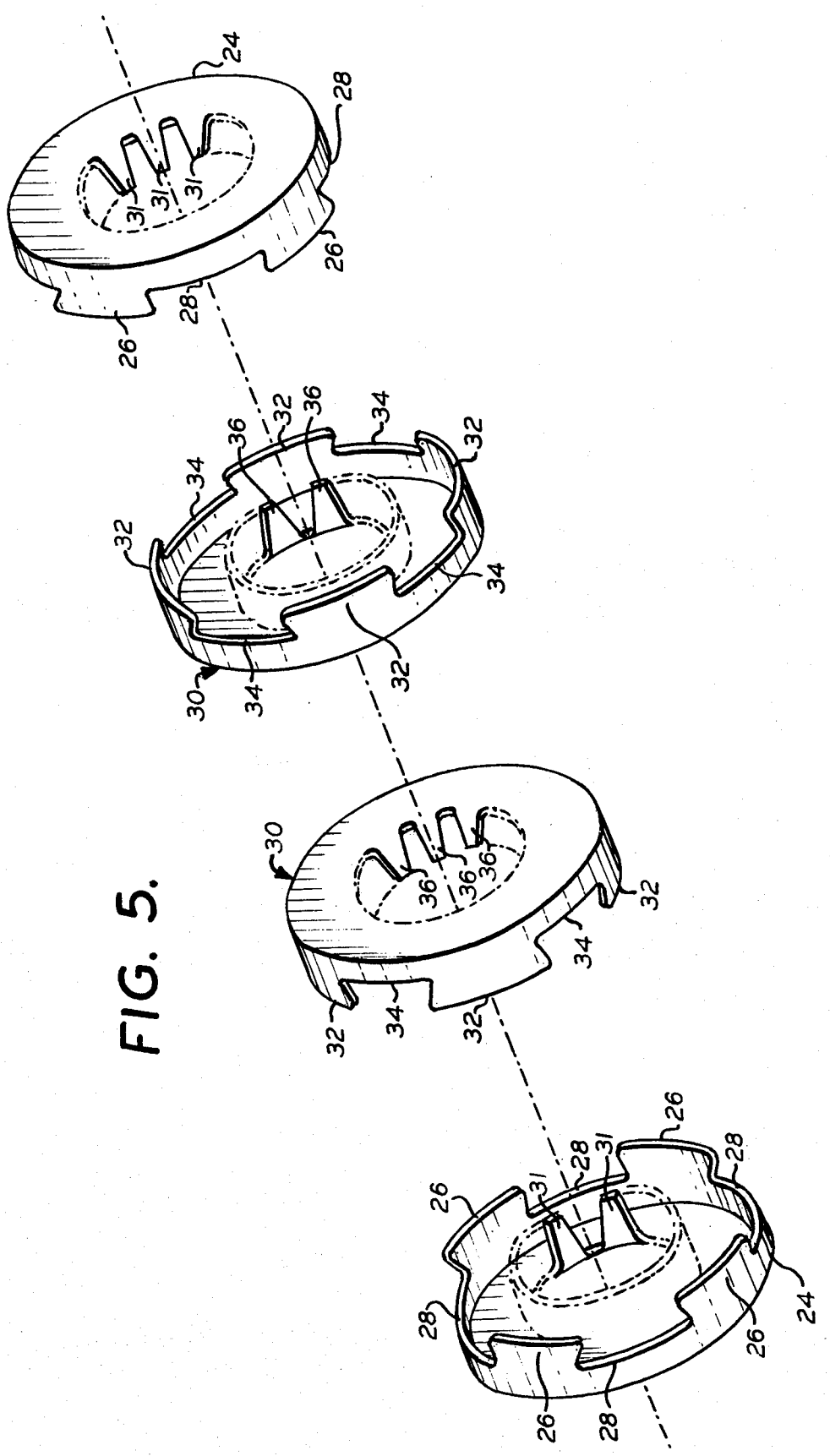
FIG. 5 is a perspective view in exploded relationship of a stator in accordance with a third form of the invention.

In the embodiment illustrated in FIG. 5, the stator assembly is generally similar to that shown in FIGS. 3 and 4 with the exception that four generally cup shaped members are provided. The outer cup shaped members 24 are identical and are each provided with four angularly spaced tabs 26, 26, 26, 26 and defined recesses 28, 28, 28, 28. Pole pieces extend in the same general direction as the tabs 26 are also provided. Each outer cup shaped member 24 cooperates with an inner cup shaped member 30 which has four tabs 32 which cooperate with the recesses 28 of the outer cup shaped members 24. Similarly recesses 34 of each inner cup shaped member 30 cooperate with a tab 26 of one outer cup shaped member 24. For most applications it is not possible to make the inner cup shaped member 30 identical with the outer cup shaped member 28. Obviously the tabs and cutouts must be cooperatively dimensioned and configured but the part members 24 and 30 cannot be identical because of the geometric requirements of the pole pieces 31 and 36 respectively of outer cup shaped members 24 and inner cup shaped members 30. In the embodiment shown in FIG. 5 as in the other embodiment the recesses 28, 34 and the tabs 26, 32 are provided with a negative taper whereby the tabs have a greater width at the extremity thereof most remote from the rest of the cup shaped member of which they are a part and the recesses 28, 34 have the maximum width at the "bottom" of the generally "U-shaped" form. Again in this embodiment the degree of negative taper that has been found most satisfactory is about one degree. The stator assembly shown in FIG. 5 is assembled normally by tackwelding together in a precisely predetermined angular relationship the two inner cup shaped members 30, 30 and then pressing the outer cup shaped members 24, 24 into locking engagement with the inner cup shaped members 30, 30.

Referring now to FIG. 4 there is shown still another feature of the apparatus in accordance with the invention. Each cup shaped member 18 is also provided with recesses 40, 40, 40, 40 which cooperate with four tabs 42, 42, 42, 42 of two generally planar pole plates 46, 46. The pole plates 46 are in the preferred embodiment absolutely planar except for the upstanding pole pieces 16. The number of tabs on each generally planar pole plate is not critical. For the sake of manufacturing simplicity and minimizing cost the inner pole plates 46 should be identical as they are in the illustrated embodiment. Obviously the number of tabs 42 needs to be great enough to provide stability to the entire assembly and it is believed that a minimum of three will be required on each pole plate to accomplish this objective. An extruded dowel (not shown) and cooperating holes 48 in the cup shaped members 18, 18 and the pole plates 46, 46 cooperate to orient the inner pole plates with each other independently of the outer cup shaped members. The interlocking tabs 20 and recesses 22 of the cup shaped members 18 establish the orientation of the poles.

It will be understood that the recess 40 for the inner pole plates tabs 42 provided in each cup shaped member 18 have a total height which is less than the combined thickness of two inner pole plates 46. This dimensional relationship is essential to prevent axial movement of the pole plates. More specifically the "bottom" of the generally U-shaped cutout of the cup shaped members butt tightly against the pole plates to secure and locate the inner pole plates 46 relative to the outer cup shaped members 24.

Figure 1:
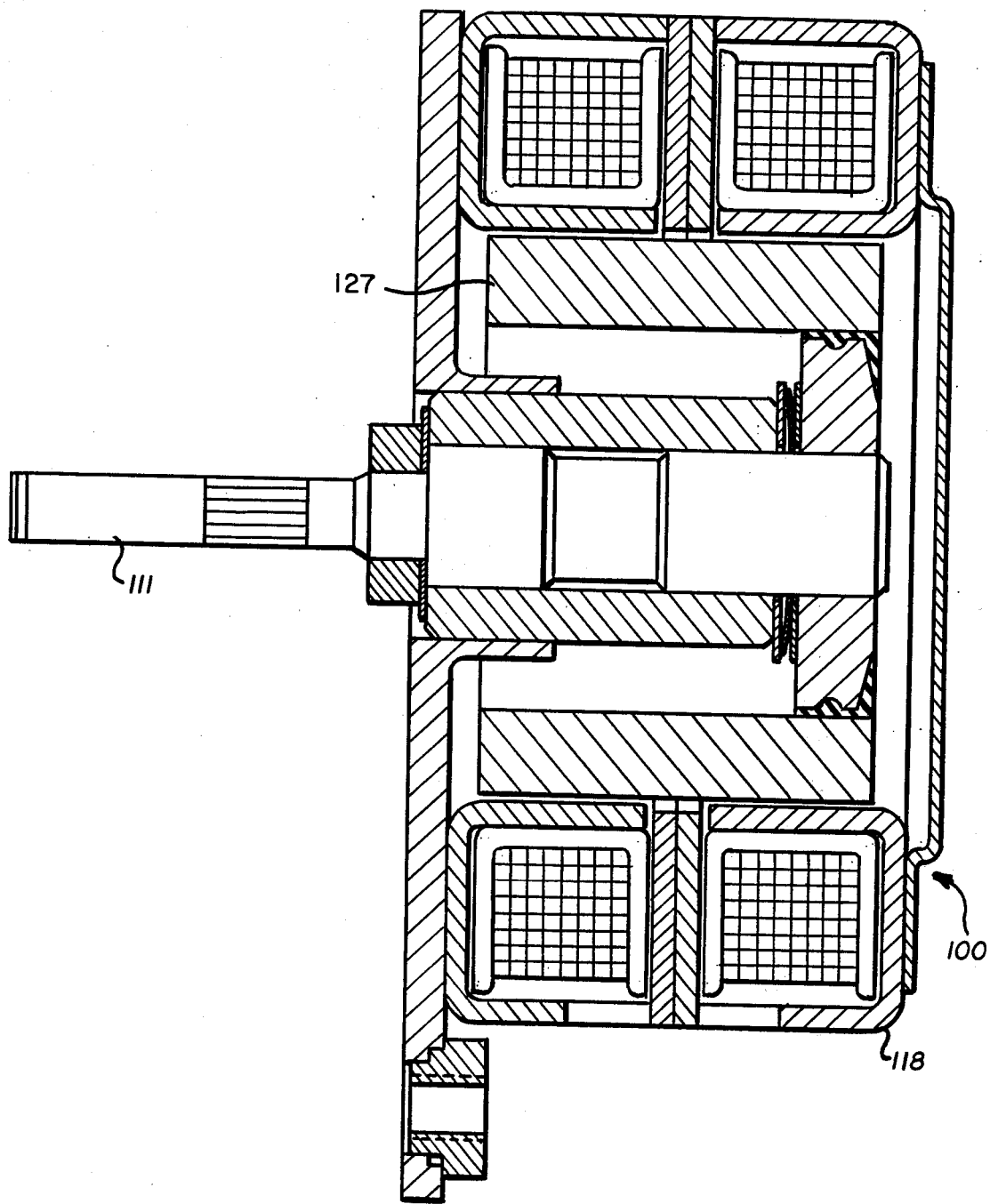
FIG. 1 is a sectional elevational view of a motor in accordance with one form of the invention which is more particularly a stepping motor having axially spaced multipole stator sections.
Figure 2:
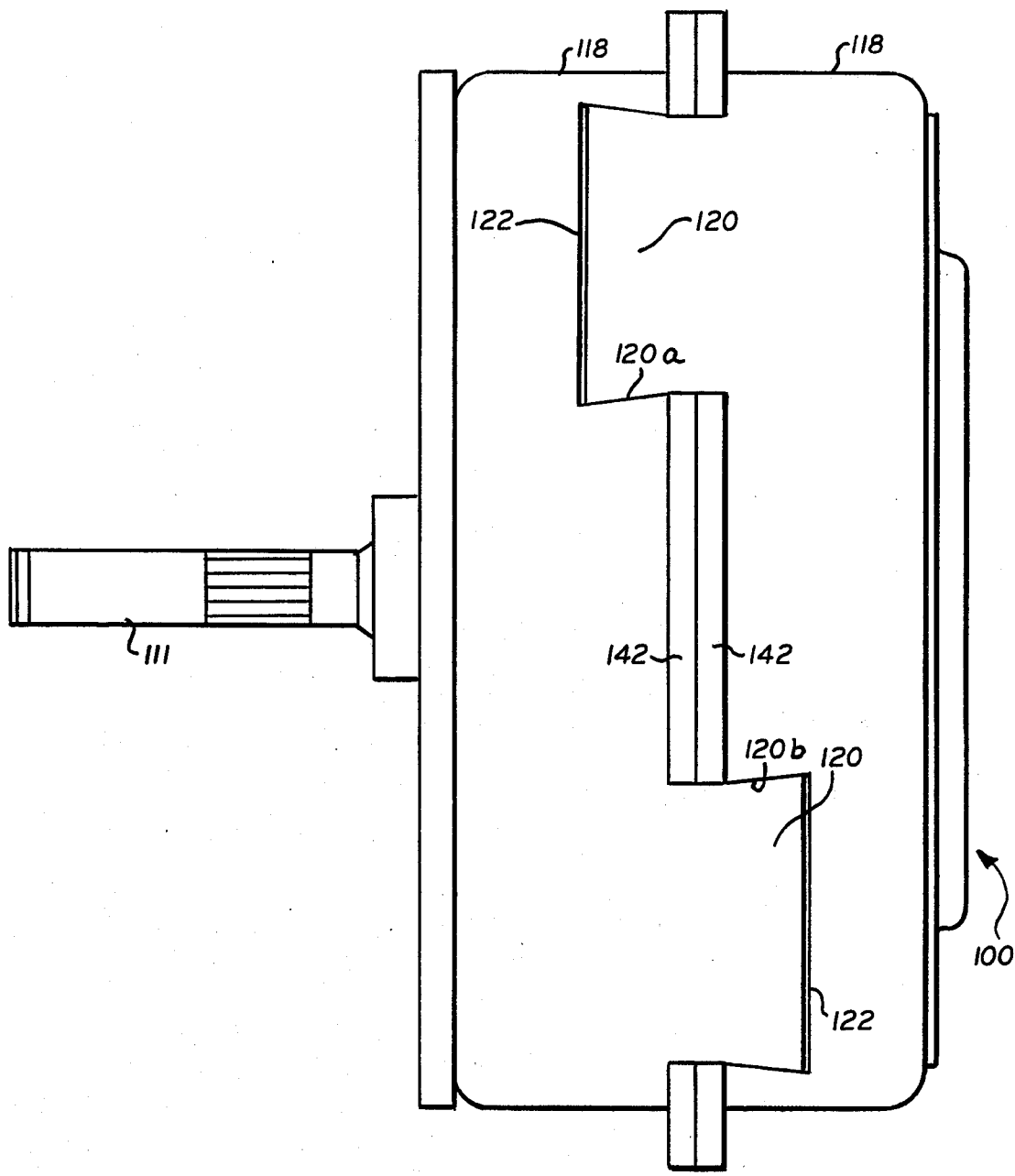
FIG. 2 is an elevational view of the motor shown in FIG. 1.

Referring now to FIGS. 1 and 2 there is shown still another embodiment of the invention which includes a rotor 127, two opposed cup shaped members 118, 118 which together with two pole plates 142, 142 constitute the stator for the motor 100. In this embodiment each cup shaped member 118 includes a plurality of tabs 120 (two shown) which cooperate with recesses 122. Preferably the tabs 120 and recesses 122 have a negative taper as in the other embodiments of approximately one degree. In this embodiment instead of a discrete recess 40, as in FIG. 3 and FIG. 4, the tabs 142 of the pole plates are captured in a recess which is defined intermediate to angularly tabs 120, 120. More specifically as shown in FIG. 2 the tab 120 of the left cup shaped member 118 and the tab 120 of the right cup shaped member define the "recess" in which two tabs 142 of two separate pole plates are captured. In this embodiment the negative taper of the tabs 120 extends from the root of the tab. It will be seen from FIG. 2 that there is a clearance intermediate the "tip" of each tab 120 and the base or root of the recess 122. This dimensional relationship insures that the pole plate tabs 142 are securely captured to prevent axial movement. In addition the dimensional relationship between the tabs 142 and the sides 120a and 120b of tabs 120, 120 is chosen so that there is a snug fit to prevent relative angular motion between the pole plates and the cup shaped members 118, 118.

The dimensional relationship which prevents relative axial movement will be understood to have particular application to motors having axially spaced stator sections although application to other electric devices may also be apparent to those skilled in the art. The negative taper tabs and recesses will be understood to have application to dynamo electric devices having single as well as multi-section stators.

It will be seen the described construction avoids the use of the internal volume of the motor envelope for two thicknesses of metal such as has been used in prior art constructions which utilize outer and inner cup members. It will also be seen that the accuracy of the pole orientation between the cup shaped members and the pole plates is improved over the prior art structure since one common cup assembly of two cup shaped members constrains the positioning and angular orientation of the pole pieces. In those constructions having a negative taper to the tabs of the cup shaped members the person assembling the apparatus merely presses the two cup shaped members together where upon they will lock positively providing a positive connection without the necessity for welding or the introduction of assembly errors due to inaccurate tooling.

What we claim as new and desired to secure by letters patent of the United States:

1. An electric motor having:
   a rotor having an axis;
   a stator having a first cup shaped member having a wall which is disposed generally normal to the axis of said rotor and a circumferential surface disposed generally concentric with said axis, said circumferential surface including a plurality of tabs and a plurality of cooperatively dimensioned and configured recesses, said first cup shaped member further including a plurality of pole pieces disposed in generally aligned relationship to said axis and disposed at angularly spaced intervals about said axis;
   a second cut shaped member having a wall which is disposed generally normal to the axis of said motor and a circumferential surface disposed generally concentric with said axis, said circumferential surface including a plurality of tabs and a plurality of cooperatively dimensioned and configured recesses, said second cup shaped member further including a plurality of pole pieces disposed in generally aligned relationship to said axis and disposed at angularly spaced intervals about said axis, said tabs of said second cup member and said recesses of said first shaped cup shaped member locking together by means of interference between said tabs and said recesses to form a unitary assembly without additional fastening means between said cup shaped members;
   said stator further including a plurality of additional angularly spaced recesses in both said first and second cup shaped members disposed at angularly spaced intervals about said circumferential surface along the edge which contacts the other cup shaped member;
   first and second inner pole plates which are generally planar and have a plurality of upstanding pole pieces disposed in generally parallel relationship to the axis of said rotor, said pole plates further including a plurality of angularly spaced tabs disposed within the plane of said generally planar members and positioned and dimensioned for snug fit in said additional angularly spaced recesses of said first and second cup shaped members to prevent relative angular and axial movement therebetween.

2. The apparatus as described in claim 1 wherein the height of said additional angularly spaced recesses in said first and second cup shaped members is less than the combined thickness of said first and second pole plates so that a positive force is maintained on said pole plates in an axial direction to prevent axial movement relative to said cup shaped members.

3. The apparatus as described in claim 1 wherein the tabs of one cup shaped member which cooperates with recesses of the other of said cup shaped members have a negative taper and are dimensioned to provide an interfering fit therebetween.

4. The apparatus as described in claim 3 wherein all of said cooperating tabs and cooperating recesses have a negative taper.

5. The apparatus as described in claim 4 wherein said negative taper is approximately one degree.

6. The motor as described in claim 1 wherein said additional angularly spaced recess for said tabs of said pole plates is defined by the sides of one tab on one cup shaped member and an angularly adjacent tab on the other cup shaped member.

7. An electric motor having:
   a rotor;
   a stator having a first cup shaped member having a wall which is disposed generally normal to the axis of said motor and a circumferential surface disposed generally concentric with said axis, said circumferential surface includes a plurality of tabs and a plurality of cooperatively dimensioned and configured recesses, said first cup shaped member further including a plurality of pole pieces disposed in generally aligned relationship to said axis and disposed at angularly spaced intervals about said axis;
   a second cup shaped member having a wall which is disposed generally normal to the axis of said motor and a circumferential surface disposed generally concentric with said axis, said circumferential surface including a plurality of tabs and a plurality of cooperatively dimensioned and configured recesses, said second cup shaped member further including a plurality of pole pieces disposed in generally aligned relationship to said axis and disposed at angularly spaced intervals about said axis, said tabs of said second cup member and said cutouts of said first shaped cup shaped member locking together by means of interference between said tabs and said recesses without additional fastening means between said cup shaped members to form a unitary assembly;
   each of said tabs on said first and second cup shaped member having a negative taper and are dimensioned to provide an interfering fit with one of said recesses.

* * * * *